United States Patent [19]

Schiesterl

[11] 3,836,169

[45] Sept. 17, 1974

[54] PROTECTIVE DEVICE, ESPECIALLY FOR THE PASSENGERS OF MOTOR VEHICLES

[75] Inventor: Gerhard Schiesterl, Stuttgart, Germany

[73] Assignee: Daimler-Benz Aktiengesellschaft

[22] Filed: Mar. 10, 1972

[21] Appl. No.: 233,418

[30] Foreign Application Priority Data
Mar. 12, 1971 Germany............................ 2111898

[52] U.S. Cl....................... 280/150 AB, 280/87 R
[51] Int. Cl............................................. B60r 21/08
[58] Field of Search .... 280/150 AB, 87 R; 5/348 R; 9/11 A, 315, 316, 321; 182/137; 244/138, 121

[56] References Cited
UNITED STATES PATENTS

| 3,540,304 | 11/1970 | Weiss | 280/87 R X |
| 3,586,347 | 6/1971 | Carey | 280/150 AB |
| 3,618,981 | 11/1971 | Leising | 280/150 AB |

FOREIGN PATENTS OR APPLICATIONS

| 609,624 | 9/1960 | Italy | 280/150 AB |

Primary Examiner—David Schonberg
Assistant Examiner—John P. Silverstrim
Attorney, Agent, or Firm—Craig & Antonelli

[57] ABSTRACT

A protective installation, especially for the passengers of motor vehicles with an air bag that is adapted to be automatically inflated when a predetermined vehicle deceleration is exceeded; the inflation takes place by means of a gas whereby an insert is associated with the air bag which extends transversely to the main flow direction of the gas, is disposed at a distance to the bag bottom, in relation to the main flow direction and forms within its area disposed in the main flow of the inflating gases a deflecting surface for the inflowing gases.

27 Claims, 2 Drawing Figures

PATENTED SEP 17 1974  3,836,169
FIG. 1
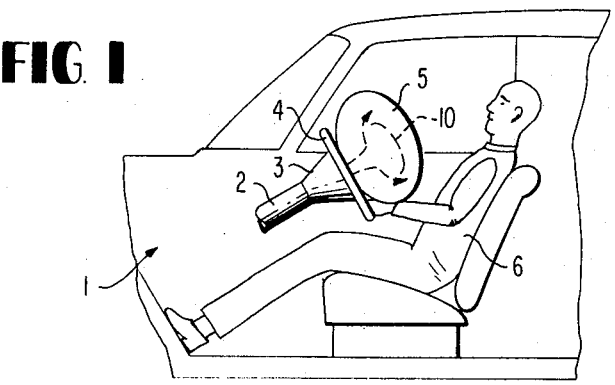
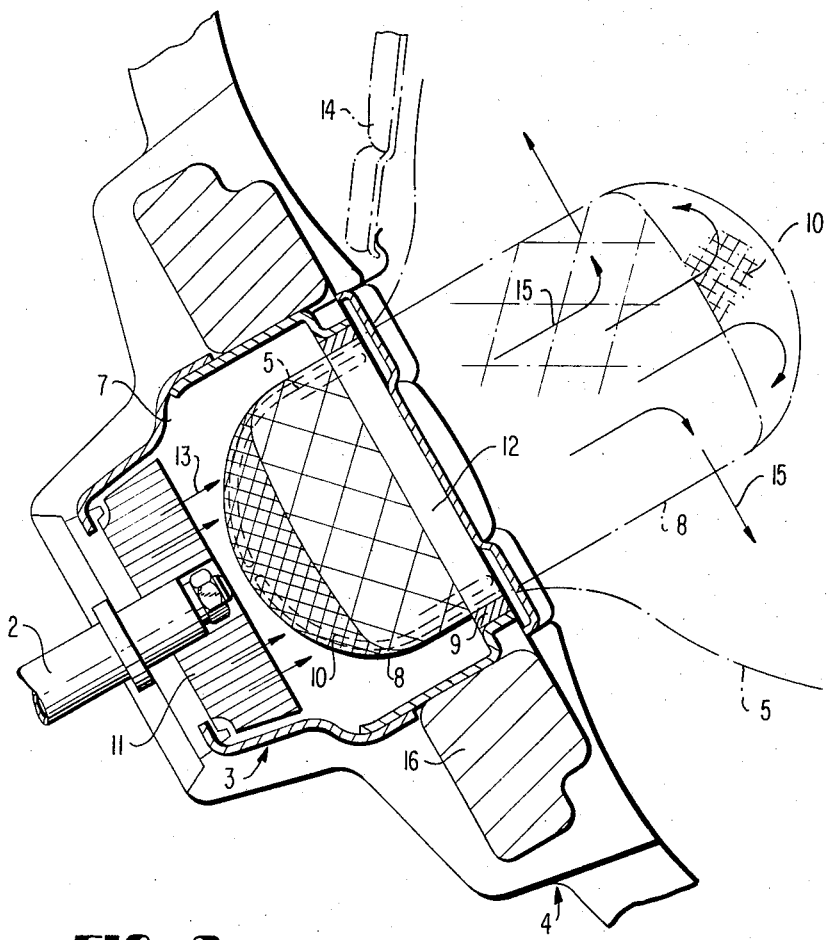
FIG. 2

PROTECTIVE DEVICE, ESPECIALLY FOR THE PASSENGERS OF MOTOR VEHICLES

The present invention relates to a protective device, especially for the passengers of motor vehicles, having an air bag which is automatically inflatable by means of a gas when the vehicle exceeds a predetermined deceleration.

The inflation of the air bag is to be terminated with protective devices of the aforementioned type in a fraction of a second, and more particularly as a rule, in approximately 0.025 seconds. For that purpose, a nearly instantaneous filling of the air bag with gas is necessary. It has now been discovered that the bang occurring during the sudden filling of the air bag and the corresponding rapid inflation thereof reaches an intensity which may cause physical injuries in human beings, and more particularly with older persons.

The present invention is concerned with the task to reduce the noise development occurring during the inflation of the air bag at least to such an extent that injuries are precluded.

This is attainable according to the present invention with a protective installation of the aforementioned type in that an insert which extends transversely to the main flow direction of the gas and is disposed during the inflation at a distance to the bag bottom in relation to the main flow direction of the gas, is coordinated to the air bag, which insert forms in its area disposed in the main gas stream an impact or deflecting surface for the inflowing gas.

It is avoided by such a construction that the air bag is inflated at the beginning of the inflating operation essentially only in one direction, and more particularly only in the direction toward the person to be protected, and initially expands in the flow direction of the gas with relative small diameter and with corresponding high velocity lying in the supersonic range, which brings about a partial compression of the atmosphere surrounding the air bag and may trigger the known supersonic boom which lies in its intensity considerably above the other noises occurring during the inflation of the air bag so that the noise development occurring during the inflation of the air bag is considerably reduced by the solution of the present invention.

The construction according to the present invention has proved particularly appropriate in protective installations in which the air bag is inflatable from a folded-in position in which it is disposed on the inside of a hollow space, and within the area of its edge zone is connected with the edge area of the hollow space. Especially with such an arrangement of the air bag which enables a particularly space-saving accommodation thereof, a particularly sharp or intense gas flow may result since the hollow space is appropriately kept as small as possible for space-saving reasons. The air bag disposed in its folded position within the hollow space is arranged with advantage within a gas-permeable casing adapted to be turned inside out, which is secured within the area of the free edge zone of the hollow space in order to assure during the inflation operation a favorable gas engagement at the initially folded air bag as well as a frictional-less turning inside out of the air bag out of the hollow space.

If within the scope of the present invention such a cuff-like casing is provided which with a folded-in air bag is disposed together with the latter within the hollow space, then it is advantageous if the casing is adapted to be turned inside out out of the hollow space during the inflation of the air bag together with the latter and is provided within its center area remote from its edges with a zone at least far-reachingly non-permeable to gases of high velocity which forms the impact or deflection surface. A simple overall construction results from such a construction. In addition thereto, also the arrangement according to the present invention of the insert forming the deflection surface can be achieved thereby in a simple manner. In order to assure with such a construction of the casing an undisturbed discharge or escape of the gases out of the area of the casing, the casing appropriately has an open structure outside of its center area and, for example, is formed or constituted by holding lines or guy lines which are interwoven with each other in a net-like manner.

A further appropriate construction of the casing results if the casing is constructed in a net-like manner and is provided within its center area remote from its edge with an abutment in the form of an overlay or the like that serves as deflecting surface.

If the air bag is to serve as protective device for the driver of a motor vehicle, which is steerable by way of a steering wheel, then a particular space-saving construction results if the hollow space is constituted by a deformation member arranged at the upper end of the steering spindle.

The gas necessary for filling the air bag can be produced within the scope of the present invention in a gas producer which is arranged advantageously on the inside of the hollow space and is disposed underneath the cuff-like casing since a particularly space-saving overall arrangement results therefrom. Within the scope of the present invention, also an arrangement may prove appropriate in which at least one gas producer is provided adjacent the hollow space.

Accordingly, it is an object of the present invention to provide a protective device, especially for the passengers of motor vehicles, which avoids the aforementioned shortcomings and drawbacks encountered in the prior art.

Another object of the present invention resides in an air bag adapted to be automatically inflated which minimizes the danger of serious injuries to the person due to a supersonic boom that may be produced by the inflation of the air bag.

A further object of the present invention resides in a protective device including an inflatable air bag which far-reachingly reduces the noise development to an extent precluding supersonic bangs.

A further object of the present invention resides in a protective device of the type described above which is simple in construction, space-saving in its installed condition and reliable in operation.

These and other objects, features and advantages of the present invention will become more apparent from the following description when taken in construction with the accompanying drawing which shows, for purposes of illustration only, one embodiment in accordance with the present invention, and wherein FIG. 1 is a schematic view of a part of a passenger motor vehicle which is equipped with a steering wheel and in which an air bag is inflatable in front of the steering wheel for the protection of the driver, and FIG. 2 is a longitudinal cross-sectional view, on an enlarged scale, through the upper area of the steering wheel in which the construction according to the present invention of the protective installation including the air bag is also schematically shown.

Referring now to the drawing wherein like reference numerals are used throughout the two views to designate like parts, and more particularly to FIG. 1, the passenger motor vehicle only schematically illustrated in part and generally designated therein by reference numeral 1, includes a passenger cell within which is located the steering column 2. The steering wheel 4 is connected with the steering column 2 by way of a hollow deformation member 3, a so-called impact pot of conventional construction. An air bag 5 is shown above the steering wheel 4 which in case of a possible impact of the vehicle forms a protective and intercepting device for the driver 6. The air bag 5 is automatically inflatable by means of a gas under pressure when the vehicle exceeds a predetermined vehicle deceleration, and is illustrated in FIG. 1 in an intermediate phase during the inflation. In its normal position the air bag 5, as will be described more fully by reference to FIG. 2, is folded-in within the hollow deformation member 3, whose hollow space is designated in FIG. 2 by reference numeral 7.

The air bag folded into the hollow space 7, of which only a few folds are indicated in FIG. 2 in dash line for sake of simplicity, is disposed within a casing 8 that has the shape of a cuff to be inverted and like the air bag is mounted with its free edge within the free edge zone 9 of the hollow space 7. The casing 8 has in the illustrated embodiment a net-like structure and is so constructed in its center area 10 remote from its edges that it is at least far-reachingly impermeable to gases of high flow velocity. This relative gas impermeability is attainable, for example, by a thickened structure of the net wall or also by an overlay or the like.

In the illustrated embodiment, a gas producer 11 is arranged on the inside of the hollow space 7 which, for example, may be constituted by a pyrotechnical charge that possesses a strong gas development immediately after its ignition.

If the gas producer 11 is activated, then at first a pressure builds up on the inside of the hollow space 7 by means of which initially the cover-like closure member 14 closing off or covering the opening 12 of the hollow space 7 and illustrated in its already open position, is pushed-off and by means of which subsequently the air bag 5 is forced outwardly and is unfolded. Simultaneously therewith, also the casing 8 is thereby turned inside out since after baring the opening 12 of the hollow space 7, a gas flow results whose direction is indicated by the arrows 13. Corresponding to the requirement that the air bag 5 has to be filled in approximately 0.025 seconds after the triggering of a sensor system (not shown) which is caused by exceeding a predetermined vehicle deceleration, large gas quantities have to be produced by the gas producer 11 in the shortest time which escape out of the hollow space 7 by way of the opening 12. High gas velocities result therefrom. The gases flowing with such high velocities out of the hollow space 7 in the direction of the arrows 13 are now prevented by the construction in accordance with the present invention in the continuation of their rectilinear movement by that zone 10 of the inverted casing 8 which is at least far-reachingly impermeable to gases of high flow velocity and forms a hood-like insert serving as deflecting surface. In the inverted condition the casing 8 thus represents according to the present invention a parachute-like part, in the hood of which, formed by the center area 10 thereof, at least a large portion of the gases escaping essentially rectilinearly are caught and deflected laterally which is indicated by the arrows 15.

It is avoided by this catching of the gas flow that the air bag during the inflation operation initially expands only rectilinearly corresponding to the main flow direction of the gas and snaps out lance-like toward the driver before it assumes the balloon-shaped inflation of the bag, aimed at as such. This is not only undesirable because with such an expansion of the bag which takes place essentially only in the main flow direction of the gas, particularly high and unfavorable stresses become effective in the casing of the bag but also because the expansion of the bag in the main flow direction of the gases takes place also with such high velocity, namely in the supersonic range, so that a pressure cone builds up in the expansion direction in front of the bag which has as a consequence the known supersonic boom whose intensity is far greater than the remaining noises occurring during the inflation of the air bag.

By reason of the fact that with the solution according to the present invention the gas flow is caught and, as illustrated by the arrows 15, is deflected and distributed, an expansion of the envelope of the air bag which is essentially uniform over the envelope thereof is achieved. The velocity, with which the case of the air bag 5 moves outwardly during the inflation, is thereby far-reachingly rendered uniform and lies in all areas below the sound velocity so that the feared supersonic boom is avoided and therewith the noise development during inflation of the bag is considerably reduced.

In lieu of the gas producer 11 arranged underneath the casing 8 in the hollow space 7 or also in addition thereto, one or several gas producers 16 may also be provided laterally adjoining the hollow space 7, and more particularly, for example, on the inside or in the transition to the spokes of the steering wheel. The overflow of the gases developed during the activation of the gas producers 16 into the hollow space 7 can take place by apertures provided in the deformation member 3. Also with this arrangement of gas producers a main flow direction corresponding to the arrows 13 results for the gas during the transition out of the hollow space 7 into the unfolding air bag 5 since with the gas quantity to be developed in the shortest possible time which has to pass over into the bag by way of the opening 12, this opening has a nozzle-like effect notwithstanding its size. Of course, in lieu of pyrotechnical charges, also gas producers of other known types may be provided within the scope of the present invention, and more particularly those in which a gas, such as Freon 12, is converted from its liquid condition into its gaseous condition by the addition of heat. The required evaporating heat is developed with gas producers of this type by means of a cartridge which can be ignited by way of a sensor system of any conventional type in dependence on a predetermined limit value of the vehicle deceleration.

While I have shown and described only one embodiment in accordance with the present invention, it is understood that the same is not limited thereto but is susceptible of numerous changes and modifications as

What I claim is:

1. A protective device for motor vehicles, comprising: inflatable air bag means, a gas producing means for automatically inflating said inflatable air bag means upon exceeding a predetermined vehicle deceleration, an insert means provided in said air bag means, said insert means extending substantially transversely to the main flow direction of the gas, said insert means having a first position with said air bag means disposed therein and a second inverted position when said air bag means is inflated, said insert means during the inflation of said air bag means extending into said air bag means a predetermined distance from the inner surface of said air bag means substantially centrally of the main flow direction of the gas, said insert means being provided with a deflecting surface means within its area disposed within the gas mainstream for deflecting the inflowing gas.

2. A protective device according to claim 1, wherein a hollow space means is provided in which is disposed said insert means and said inflatable air bag means in a folded position, said inflatable air bag means being connected in its free edge area with the edge zone of the hollow space means.

3. A protective device according to claim 2, wherein said deflecting surface means includes a parachute-like hood for deflecting the inflowing gas.

4. A protective device according to claim 3, wherein said insert means includes a casing means, said casing means being secured within the area of the free edge zone of said hollow space means, said inflatable air bag means in its folded position being disposed in said casing means.

5. A protective device according to claim 4, wherein said casing means is turned inside out to said second inverted position during inflation of the air bag means together with the latter out of the hollow space means, and said casing means is provided in its center area remote from said secured edges with a zone that is substantially impermeable to gases of high velocity to form said parachute-like hood deflecting surface means.

6. A protective device according to claim 5, wherein said casing means has a substantially open structure outside its center area.

7. A protective device according to claim 6, wherein said casing means is held outside its center area by retaining lines.

8. A protective device according to claim 7, in which a motor vehicle is adapted to be steered by a steering wheel connected with a steering spindle, wherein said hollow space means is comprises a deformation member arranged at the upper end of the steering spindle.

9. A protective device according to claim 8, wherein said gas producer means is arranged on the inside of said hollow space means and is disposed underneath said casing means.

10. A protective device according to claim 9, wherein at least one gas producer means arranged adjoining said hollow space means is provided for producing the gases.

11. A protective installation, especially for the passengers of motor vehicles comprising: inflatable air bag means, hollow space means in which is disposed said inflatable air bag means in a folded position, said inflatable air bag means being connected in its free edge area with the edge zone of said hollow space means, gas producing means for automatically inflating said inflatable air bag means upon exceeding a predetermined vehicle deceleration, insert means provided in said inflatable air bag means, said insert means extending substantially transversely to the main flow direction of the gas and being disposed during inflation at a predetermined distance from the inner surface of said air bag means substantially centrally of the main flow direction of the gas, said insert means being provided with a deflecting surface means for deflecting the inflowing gas, said deflecting surface means being disposed substantially within the gas mainstream and said insert means includes a casing means secured within the area of the free edge zone of said hollow space means, said casing means having a first position with said inflatable air bag means in its folded position disposed therein, said casing means having a second inverted position, said casing means being displaced to said second inverted position by the flow of gas produced by said gas producing means.

12. A protective installation according to claim 11, wherein said casing means is turned inside out to said second inverted position during the inflation of the air bag means together with the latter out of the hollow space means, and said casing means is provided in its center area remote from the secured edge with a zone that is at least far-reachingly impermeable to gases of high velocity and forms said deflecting surface means.

13. A protective installation according to claim 12, wherein said casing means has a substantially open structure outside its center area.

14. A protective installation according to claim 13, wherein said casing means is held outside its center area by retaining lines.

15. A protective installation according to claim 14, wherein said casing means is constructed netlike and said impermeable zone includes an inlay means for serving as said deflecting surface means.

16. A protective installation according to claim 15, in which a motor vehicle is adapted to be steered by a steering wheel connected with a steering spindle, wherein said hollow space means comprises a deformation member arranged at the upper end of the steering spindle.

17. A protective installation according to claim 16, wherein said gas producer means is arranged on the inside of said hollow space means and is disposed underneath said casing means.

18. A protective installation according to claim 17, wherein at least one gas producer means arranged adjoining said hollow space means is provided for producing the gases.

19. A protective installation according to claim 18, wherein the gas flowing into said air bag means has a main flow direction approximately parallel to the axis of said hollow space means.

20. A protective installation according to claim 12, wherein said casing means is held outside its center area by retaining lines.

21. A protective installation according to claim 11, wherein said casing means is constructed netlike and said impermeable zone includes an inlay means for serving as said deflecting surface means.

22. A protective installation according to claim 11, in which a motor vehicle is adapted to be steered by a steering wheel connected with a steering spindle, wherein said hollow space means is comprises a deformation member arranged at the upper end of the steering spindle.

23. A protective installation according to claim 22, wherein said gas producer means is arranged on the inside of said hollow space means and is disposed underneath said casing means.

24. A protective installation according to claim 23, wherein at least one gas producer means arranged adjoining said hollow space means is provided for producing the gases.

25. A protective installation according to claim 11, wherein the gas flowing into said air bag means has a main flow direction approximately parallel to the axis of said hollow space means.

26. A protective installation according to claim 11, wherein said gas producer means is arranged on the inside of said hollow space means and is disposed underneath said casing means.

27. A protective installation according to claim 11, wherein at least one gas producer means arranged adjoining said hollow space means is provided for producing the gases.

* * * * *